United States Patent [19]

Ohtake

[11] Patent Number: 5,099,969
[45] Date of Patent: Mar. 31, 1992

[54] APPARATUS FOR CONTROLLING VEHICLE SEMI-AUTOMATIC TRANSMISSION, INCORPORATING MEANS FOR INHIBITING AUTOMATIC CLUTCH FROM BEING FULLY RELEASED TO AVOID ENGINE RACING

[75] Inventor: Yukio Ohtake, Susono, Japan

[73] Assignee: Toyota Jidosha Kabushiki Kaisha, Aichi, Japan

[21] Appl. No.: 594,953

[22] Filed: Oct. 10, 1990

[30] Foreign Application Priority Data

Oct. 19, 1989 [JP] Japan ................................. 1-272548

[51] Int. Cl.⁵ .............................................. F16D 43/22
[52] U.S. Cl. ............................. 192/0.052; 192/0.032; 192/0.076; 192/3.58
[58] Field of Search ............... 192/0.032, 0.052, 0.076, 192/0.092, 3.58, 3.56, 21.5

[56] References Cited

U.S. PATENT DOCUMENTS

| | | | |
|---|---|---|---|
| 4,480,732 | 11/1984 | Takano | 192/0.092 X |
| 4,494,639 | 1/1985 | Takano et al. | 192/0.092 X |
| 4,529,072 | 7/1985 | Oguma et al. | 192/0.052 |
| 4,618,043 | 10/1986 | Hattori et al. | 192/0.052 |
| 4,732,644 | 2/1988 | Sakakiyama | 192/0.092 X |
| 4,905,801 | 3/1990 | Tezuka | 192/0.032 |

FOREIGN PATENT DOCUMENTS

| | | |
|---|---|---|
| 3334723 | 4/1985 | Fed. Rep. of Germany . |
| 3447638 | 7/1986 | Fed. Rep. of Germany . |
| 2071803 | 9/1981 | United Kingdom . |
| 2081412 | 2/1982 | United Kingdom ............ 192/0.092 |
| 2089458 | 6/1982 | United Kingdom ............ 192/0.092 |
| 2113341 | 8/1983 | United Kingdom . |

*Primary Examiner*—Leslie A. Braun
*Assistant Examiner*—Andrea Pitts
*Attorney, Agent, or Firm*—Oliff & Berridge

[57] ABSTRACT

A vehicle transmission control arrangement in which an automatic clutch is disengaged in response to a signal received from a shift lever switch provided to detect an operation of a shift lever for shifting a speed changing mechanism. A comparator is provided to determine whether a detected or determined output torque of an engine is smaller than a predetermined reference value below which an increase in the engine speed upon full disengagement of the clutch will not significantly deteriorate a driving comfort of the vehicle. A clutch control device is adapted to inhibit the clutch from being fully disengaged despite the presence of the signal from the shift lever switch, if the engine output torque is not smaller than the reference value.

8 Claims, 17 Drawing Sheets

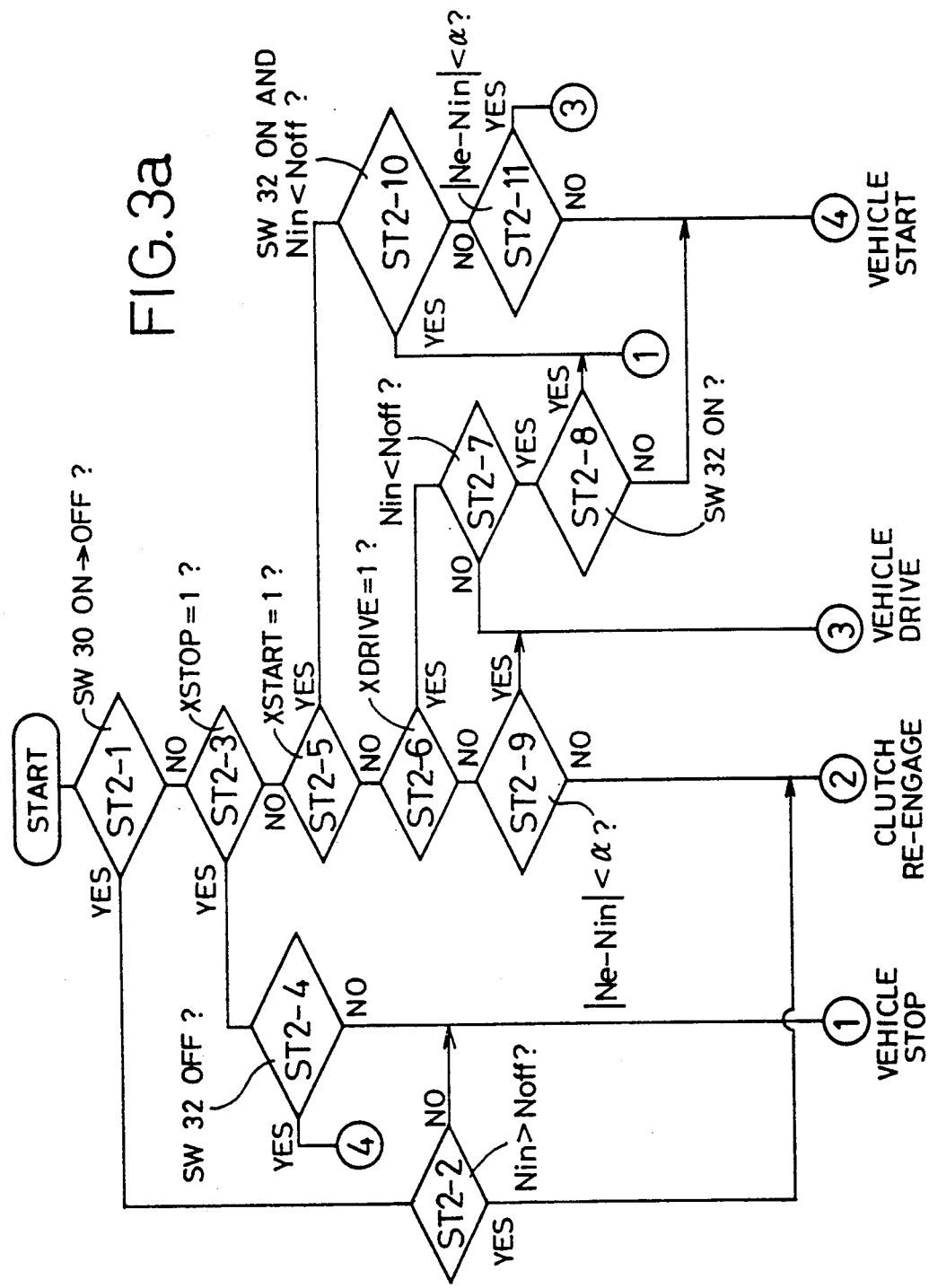

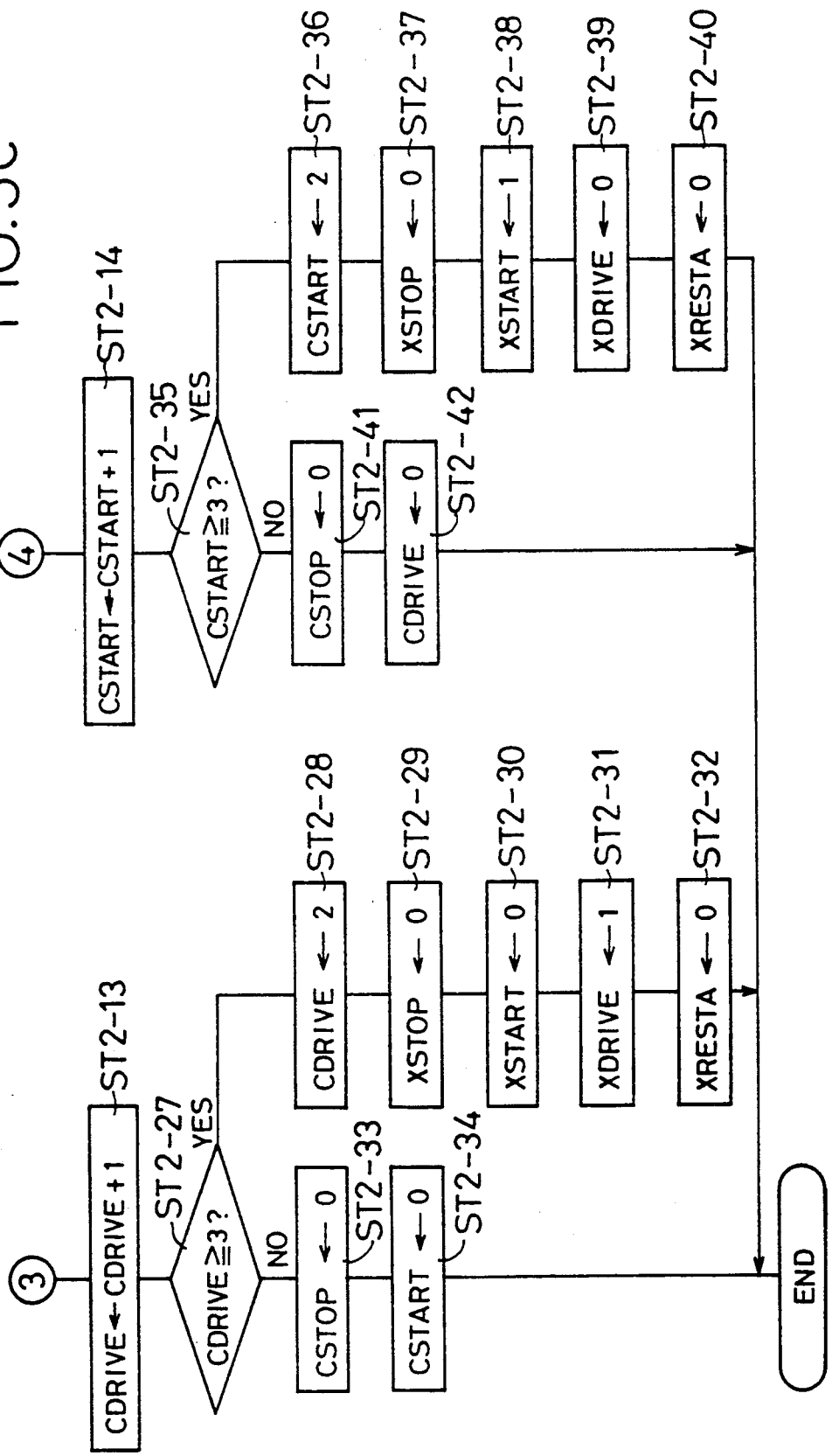

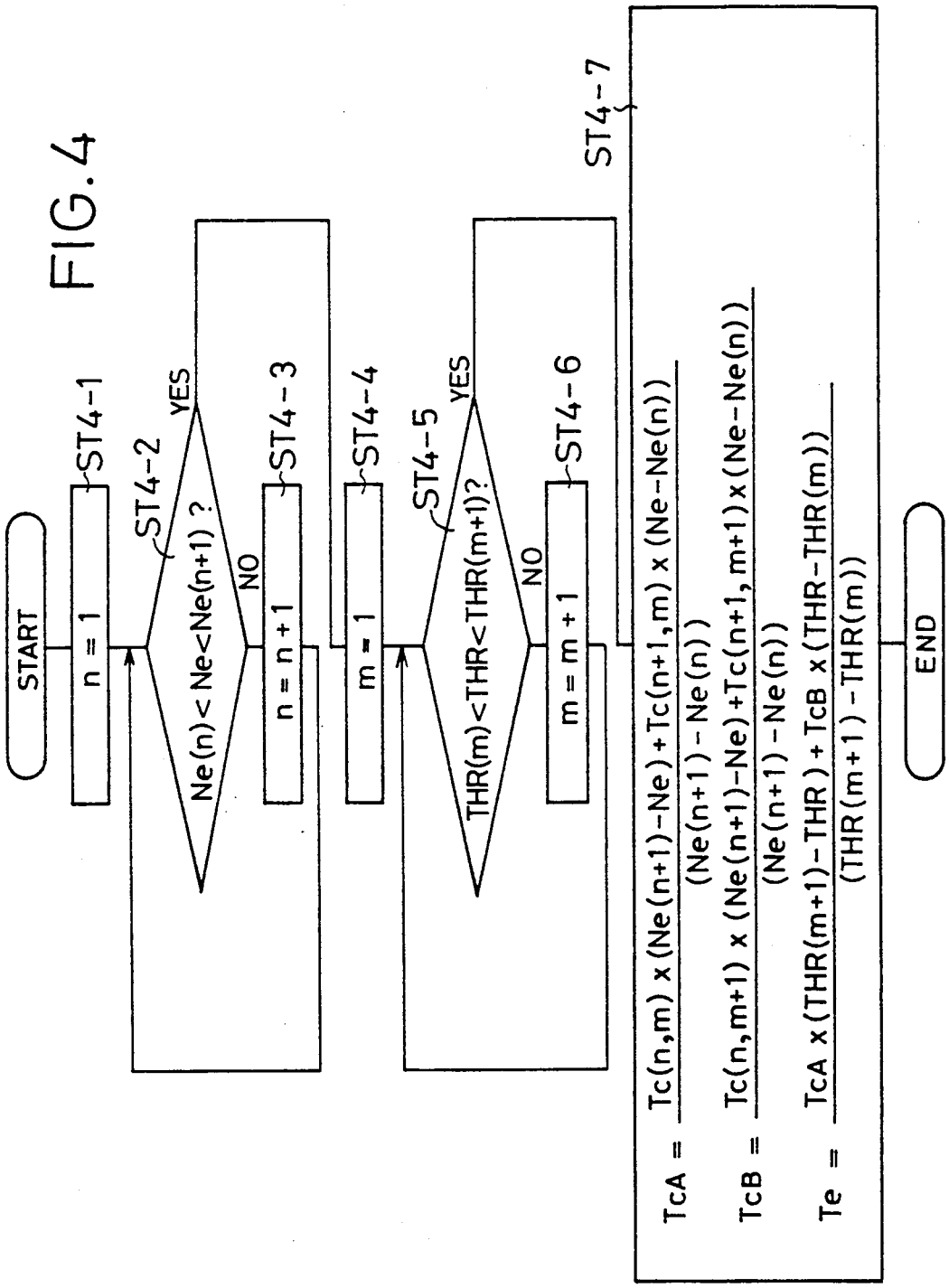

FIG.6

| | Ne(1) | Ne(2) | ..... | Ne(n) | Ne(n+1) | ..... |
|---|---|---|---|---|---|---|
| THR(1) | Tc(1,1) | Tc(2,1) | ..... | Tc(n,1) | Tc(n+1,1) | ..... |
| THR(2) | Tc(1,2) | Tc(2,2) | ..... | Tc(n,2) | Tc(n+1,2) | ..... |
| ..... | ..... | ..... | ..... | ..... | ..... | ..... |
| THR(m) | Tc(1,m) | Tc(2,m) | ..... | Tc(n,m) | Tc(n+1,m) | ..... |
| THR(m+1) | Tc(1,m+1) | Tc(2,m+1) | ..... | Tc(n,m+1) | Tc(n+1,m+1) | ..... |

FIG.17

| CLUTCH TORQUE TCL | TCL(1) | ----- | TCL(n) | TCL(n+1) | ----- |
|---|---|---|---|---|---|
| DRIVE CURRENT | PCI(1) | ----- | PCI(n) | PCI(n+1) | ----- |

FIG.20

| THROTTLE OPENING THR | THR(1) | ----- | THR(n) | THR(n+1) | ----- |
|---|---|---|---|---|---|
| CONSTANT K | K(1) | ----- | K(n) | K(n+1) | ----- |

| THROTTLE OPENING THR | THR(1) | ...... | THR(n) | THR(n+1) | ...... |
|---|---|---|---|---|---|
| TARGET FULL-ENGAGE CLUTCH SPEED | $Ne^m(1)$ | ...... | $Ne^m(n)$ | $Ne^m(n+1)$ | ...... |

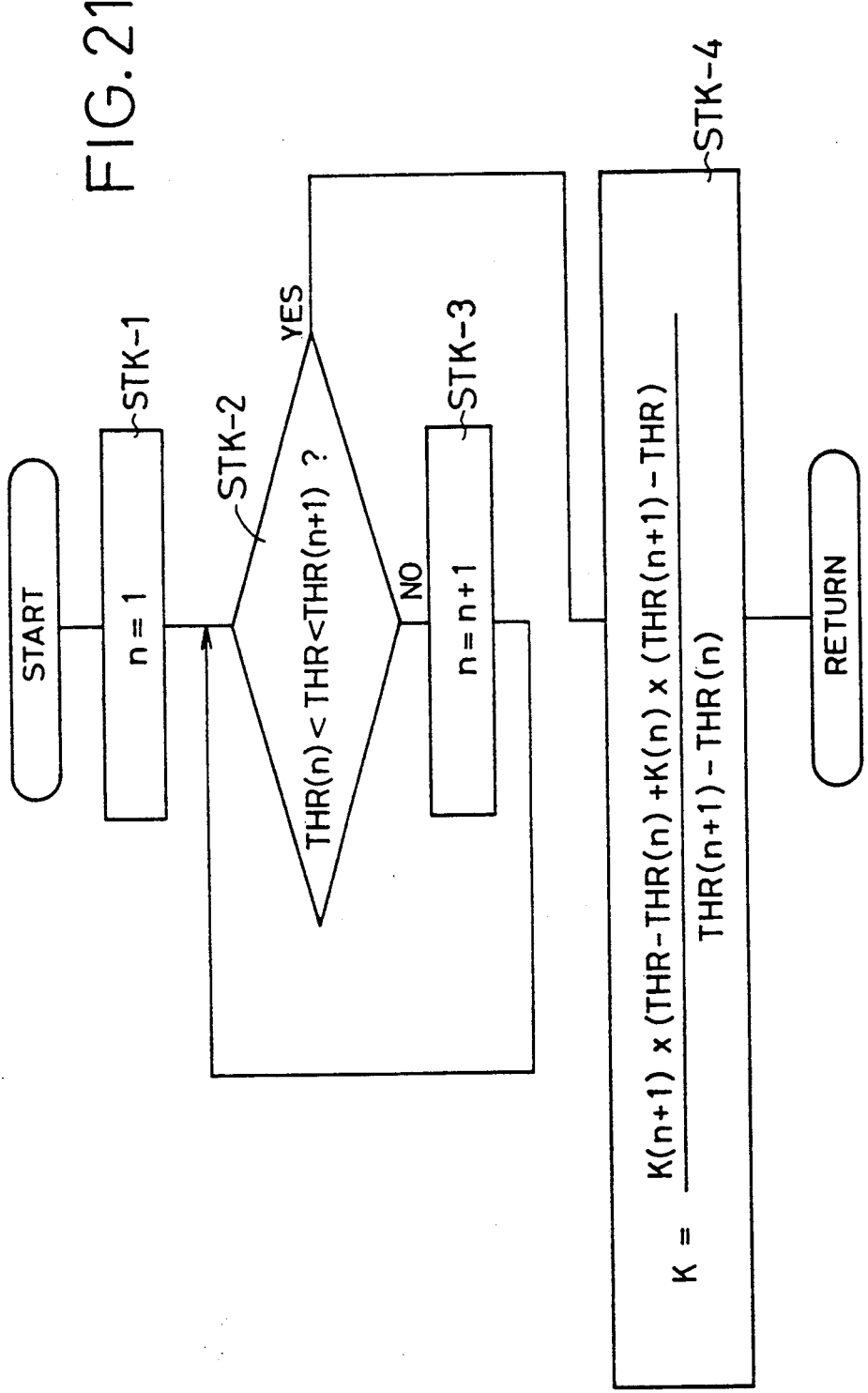

APPARATUS FOR CONTROLLING VEHICLE SEMI-AUTOMATIC TRANSMISSION, INCORPORATING MEANS FOR INHIBITING AUTOMATIC CLUTCH FROM BEING FULLY RELEASED TO AVOID ENGINE RACING

BACKGROUND OF THE INVENTION

1. Field of the Invention

The present invention relates to a method of controlling a semi-automatic transmission system for a motor vehicle, and a control apparatus suitable for practicing the method.

2. Discussion of the Prior Art

There is known a semi-automatic transmission system using a synchronous-mesh speed changing mechanism which is connected to an engine through an automatically controlled clutch to transmit power from the engine to drive wheels of the vehicle. In this type of semi-automatic transmission system, the automatic clutch is disengaged or released in response to an operation of an operator-controlled operating member such as a shift lever for shifting the synchronous-mesh speed changing mechanism. The operation of the operator-controlled operating member is detected by suitable means such as a switch provided on the shift lever. The speed changing mechanism is shifted to an appropriate position while the automatic clutch is in the released position. The engine is freed from a load when the automatic clutch is released. Accordingly, if the clutch is released due to an unintentional operation of the shift lever by the operator during running of the vehicle, the engine may race with its speed exceeding a critical level. To avoid this undesirable situation, suitable preventive means is provided to prevent the automatic clutch from being fully disengaged or to keep the clutch in the engaged state, despite the signal received from the activated shift lever switch, if the shift lever is operated to a gear or speed position (e.g., 1st-speed or low-gear position) in which the engine may race with its speed exceeding the critical level upon releasing of the clutch to bring the engine into a non-load state. An example of a control apparatus incorporating such preventive means is disclosed in Publication No. GB 2113341 A (published in 1983) of UK Patent Application.

In the known control apparatus of the type disclosed in the above-identified publication, for example, the automatic clutch is fully released if the shift lever is operated to a speed position (e.g., 4th-speed position) in which the engine speed will not exceed the critical level. In this case, however, the engine may more or less race with its speed rising to a considerably high level, causing racing noises and vibrations of the engine thereby deteriorating the driving comfort.

SUMMARY OF THE INVENTION

It is therefore a first object of the present invention to provide an apparatus for controlling a semi-automatic transmission system for a vehicle using an automatically controlled clutch and a speed changing mechanism, which apparatus prevents a vehicle engine from racing during running of the vehicle, upon operation of an operator-controlled member for shifting the speed changing mechanism.

A second object of the invention is to provide a method of controlling such a semi-automatic transmission system so as to prevent the engine racing as indicated above.

The first object may be achieved according to one aspect of the present invention, which provides a control apparatus for controlling a semi-automatic transmission system for a motor vehicle including a speed changing mechanism connected to an engine through an automatically controlled clutch to transmit power from the engine to a drive wheel of the vehicle, the clutch being disengaged in response to a signal received from shift operation detecting means for detecting an operation of an operator-controlled operating member for shifting the speed changing mechanism, the apparatus comprising: (a) torque determining means for determining an output torque of the engine; (b) comparing means for determining whether the output torque of the engine determined by the torque determining means is smaller than a predetermined reference value below which an increase in a speed of the engine upon full disengagement of the automatic clutch will not significantly deteriorate a driving comfort of the vehicle; and (c) clutch control means for inhibiting the automatically controlled clutch from being fully disengaged despite the presence of the signal from the shift operation detecting means indicative of an operation of the operator-controlled operating member, if the comparing means determines that the output torque of the engine is not smaller than the reference value.

The second object indicated above may be achieved according to a second aspect of the present invention, which provides a method of controlling a semi-automatic transmission system for a motor vehicle including a speed changing mechanism connected to an engine through an automatically controlled clutch to transmit power from the engine to a drive wheel of the vehicle, the clutch being disengaged in response to a signal received from shift operation detecting means for detecting an operation of an operator-controlled operating member for shifting the speed changing mechanism, the method comprising the steps of: (i) determining means for determining an output torque of the engine; (ii) determining whether the output torque of the engine determined by the torque determining means is smaller than a predetermined reference value below which an increase in a speed of the engine upon full disengagement of the automatic clutch will not significantly deteriorate a driving comfort of the vehicle; and (iii) inhibiting the automatically controlled clutch from being fully disengaged despite the presence of the signal from the shift operation detecting means indicative of an operation of the operator-controlled operating member, if the comparing means determines that the output torque of the engine is not smaller than the reference value.

In the control apparatus and method of the present invention, the automatically controlled clutch is inhibited from being fully disengaged or released, in spite of the presence of the signal indicative of an operation of the operator-controlled operating member, if the comparing means determines that the determined output torque of the engine is not smaller than the predetermined reference value. Accordingly, the present control apparatus and method prevents an undesired racing of the engine and a consequent deterioration of the vehicle driving comfort, which would otherwise occur due to full disengagement of the automatic clutch upon an unintentional operation of the operator-controlled operating member during running of the vehicle.

While the reference torque value varies with various parameters of the vehicle, it is usually selected to be slightly larger than zero.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which:

FIGS. 3a, 3b and 3c are flow charts illustrating a vehicle condition determining routine in step ST2 of the flow chart of FIG. 2;

FIG. 4 is a flow chart illustrating an engine torque calculating routine in step ST4 of the flow chart of FIG. 2;

FIG. 6 is a view showing a data map indicative of the engine output torque characteristic of FIG. 5;

FIG. 17 is a view showing a data map prepared from the relationship of FIG. 16, for use in the routine of FIG. 15;

FIG. 20 is a view showing a data map indicative of a relationship between the throttle opening angle and a constant used for determining the partial-engage clutch torque; and FIG. 21 is a flow chart illustrating a routine in step ST11-2 for calculating the constant used for determining the partial-engage clutch torque.

DETAILED DESCRIPTION OF THE PREFERRED EMBODIMENT

Figure 1:
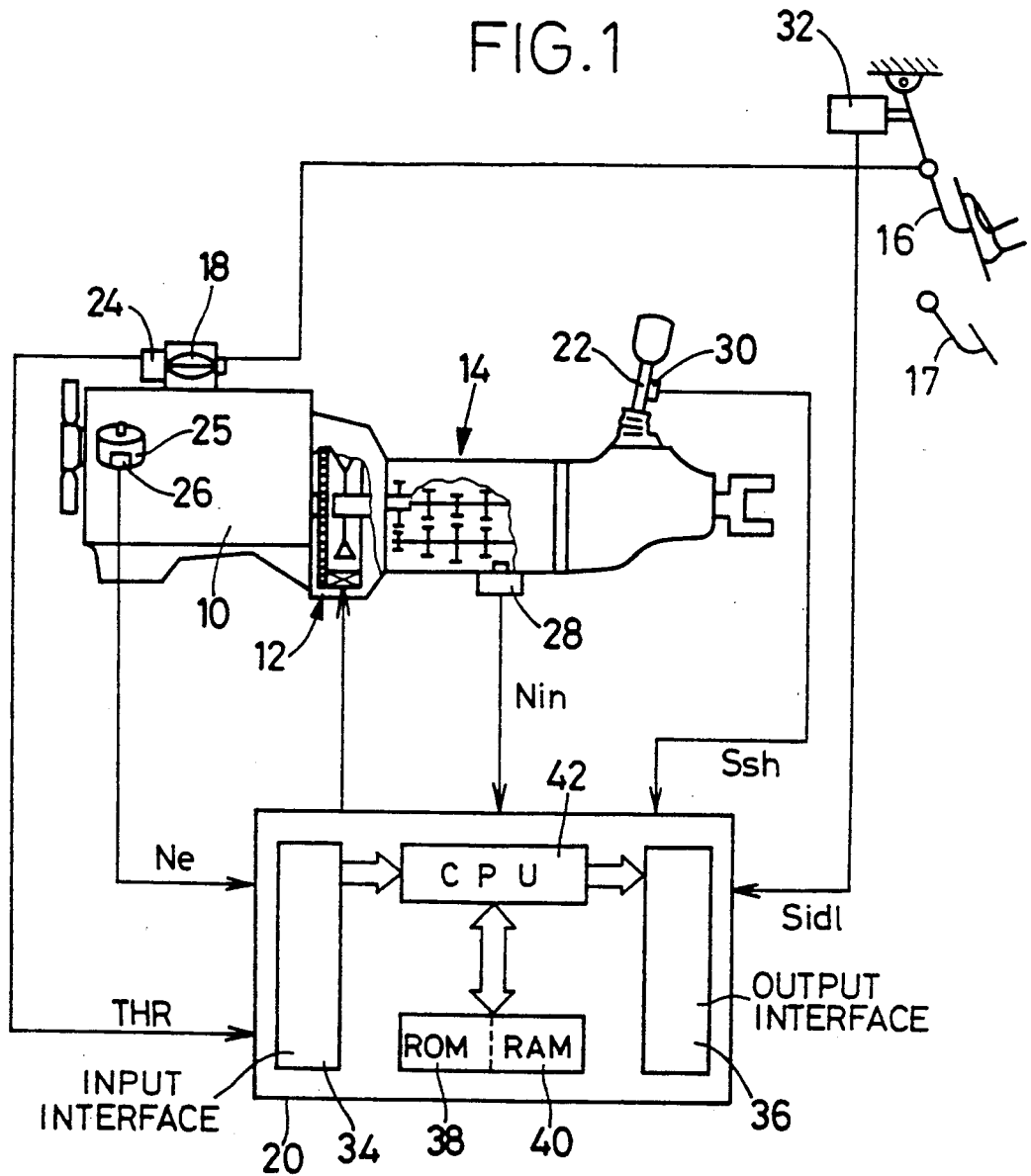
FIG. 1 is a schematic block diagram showing one embodiment of a control apparatus of the present invention, and a vehicle semi-automatic transmission system having an electromagnetic clutch controlled by the control apparatus.

Referring first to FIG. 1, there is shown a semi-automatic power transmission for a motor vehicle, wherein power produced by an engine 10 is transmitted to drive wheels of the vehicle through an electromagnetic clutch 12 of a magnetic powder type, a speed changing mechanism 14, a final reduction gear and a drive axle. The engine 10 is provided with a throttle valve 18 which is mechanically or electrically connected to an accelerator pedal 16 of the vehicle, so that an opening angle THR of the throttle valve 18 is changed according to an amount of operation of the accelerator pedal 16. The brake pedal 17 is also shown in FIG. 1.

The magnetic powder type electromagnetic clutch 12 is used as an automatic clutch automatically controlled by an electronic control device 20 also shown in FIG. 1 as the presently preferred embodiment of the invention. The electromagnetic clutch 12 is fully or partially engaged in various modes as described below, such that particles of a magnetic powder mass between the driving and driven members of the clutch 12 are magnetically bound together by a magnetic flux formed by an electric current applied to the clutch from the control device 20. The degree of engagement of the clutch 12 and a torque transmitted by the clutch 12 change with the amount of electric current applied.

The speed changing mechanism 14 is a synchronous-mesh type having two parallel shafts, which is adapted to selectively establish one of a rear drive position and two or more forward drive speed positions, when a shift lever 22 is operated to the appropriate position by the vehicle operator. The shift lever 22 serves as an operator-controlled operating member for shifting the speed changing mechanism 14.

The present semi-automatic transmission system is equipped with a plurality of sensors for detecting the running condition of the vehicle, and the signals of these sensors indicative of the corresponding vehicle running parameters are received by the electronic control device 20. More specifically, a throttle sensor 24 is provided in an intake manifold of the engine 10, which generates a THROTTLE signal indicative of the opening angle THR of the throttle valve 18. The control device 20 receives this THROTTLE signal. The control device 20 further receives an ENGINE SPEED signal generated by an engine speed sensor 26 provided adjacent to a distributor 25 of the engine 10. The ENGINE SPEED signal represents a speed Ne of the engine 10. Further, the speed changing mechanism 14 is provided with an input shaft speed sensor 28 which generates an INPUT SPEED signal. This signal, which is representative of a speed Nin of the input shaft of the speed changing mechanism 14, is received by the control device 20. The shift lever 22 is provided with a shift knob switch 30 disposed thereon, which generates a signal Ssh indicating that an operating force is applied to the shift lever 22. The accelerator pedal 16 is provided with an idle position switch 32, which generates a signal Sidl indicating that the accelerator pedal 16 is placed in its non-operated or engine idling position. The signals Ssh and Sidl are also applied to the control device 20. The shift knob switch 30 is closed in response to the operating force applied to the shift lever 22, and functions as means for detecting an operation of the shift lever 22 to shift the speed changing mechanism 14.

The electronic control device 20 is a so-called microcomputer which includes an input interface 34, an output interface 36, a read-only memory (ROM) 38, a random-access memory (RAM) 40, and a central processing unit (CPU) 42. The CPU 42 operates to process the received input signals from the various sensors and switches described above, according to a control program stored in the ROM 38, while utilizing a data storage function of the RAM 40, so that the control device 20 applies a suitably controlled electric current to the electromagnetic clutch 12.

Referring next to the flow chart of FIG. 2, there will be described an operation f the electronic control device 20 constructed according to one embodiment of the present invention. The flow chart of FIG. 2 indicates steps for various routines, which are illustrated in detail in the subsequent figures and will be explained by reference to these figures.

Figure 2:
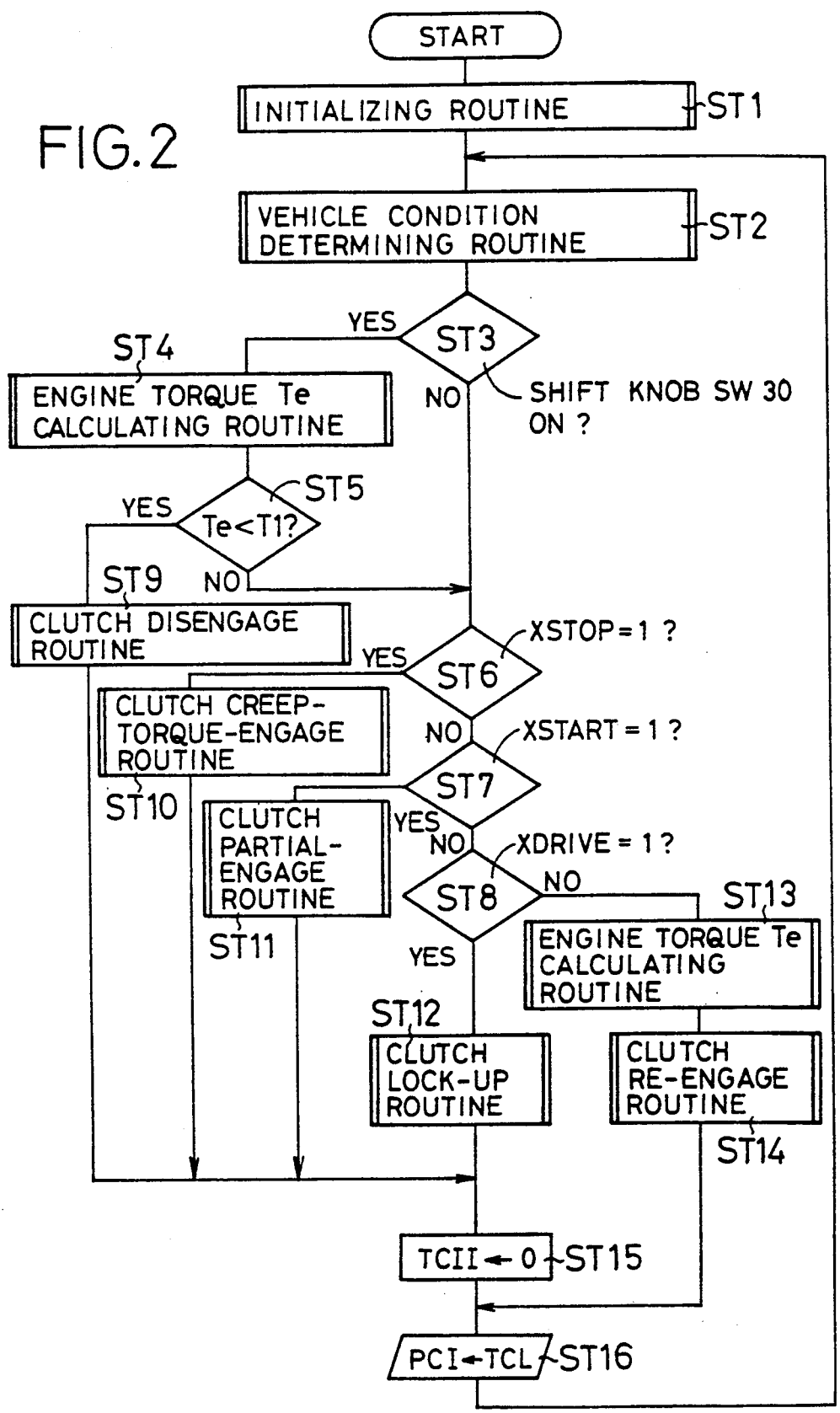
FIG. 2 is a flow chart illustrating an operation of the control apparatus of FIG. 1.
Figure 12:
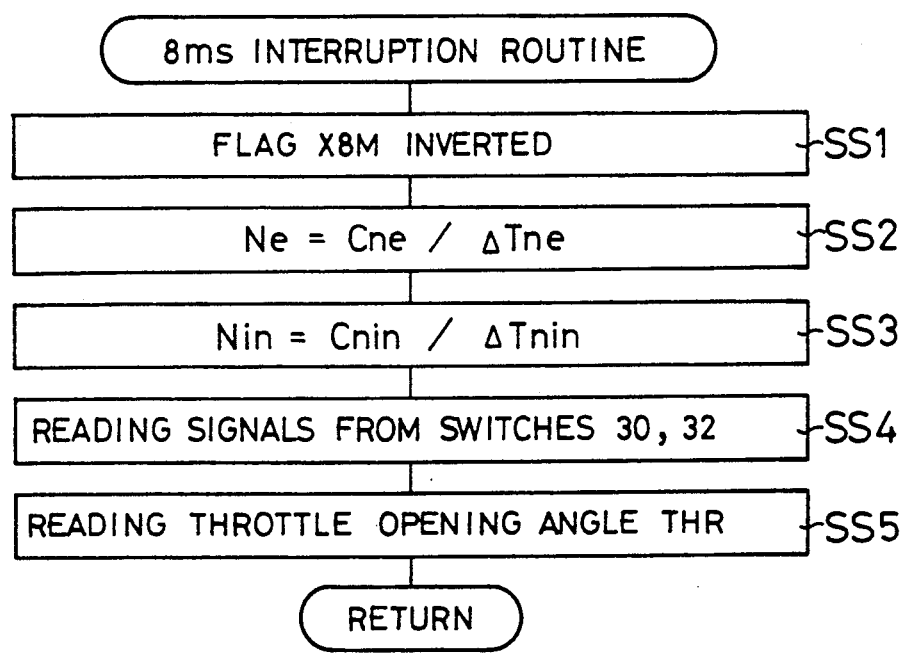
FIG. 12 is a flow chart illustrating an interruption routine for periodically effecting the inversion of a time flag and calculation of engine speed and transmission input shaft speed.

In the flow chart of FIG. 2, step ST1 is initially executed to effect an initializing routine for initializing the CPU 42 of the electronic control device 20, more specifically, resetting or updating various registers, counters and control flags of the CPU 42. In the present embodiment, an 8 msec. interruption routine as illustrated in FIG. 12 is implemented in step ST1, to calculate the speed Ne of the engine 10, and the input shaft speed Nin of the speed changing mechanism 14, at an interval of 8 msec. Described in detail, step SS1 is first executed to invert a time control flag X8M, and step SS2 is then executed to calculate the engine speed Ne from an ignition period $\Delta Tne$ of the engine 10, according to the following equation (1):

$$Ne = Cne/\Delta Tne \tag{1}$$

Step SS2 is followed by step SS3 to calculate the input shaft speed Nin from a rotating period $\Delta Tnin$ of the input shaft of the speed changing mechanism 14, according to the following equation (2):

$$Nin = Cnin/\Delta Tnin \tag{2}$$

Figure 13:
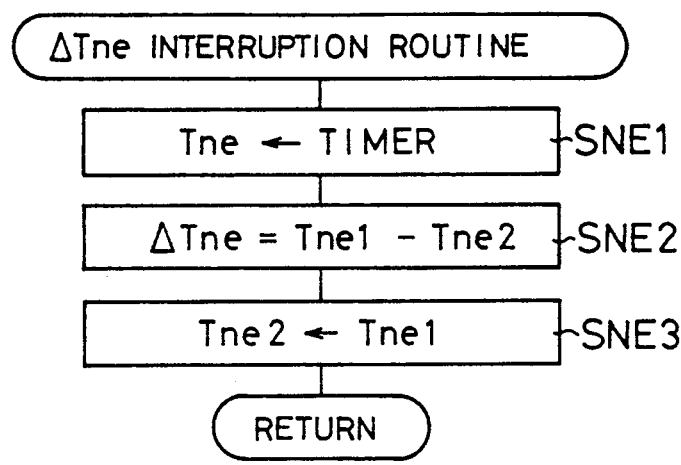
FIGS. 13 and 14 are flow charts respectively illustrating interruption routines for calculating an engine ignition period and a transmission input shaft rotating period which are used in the routine of FIG. 12.
Figure 14:
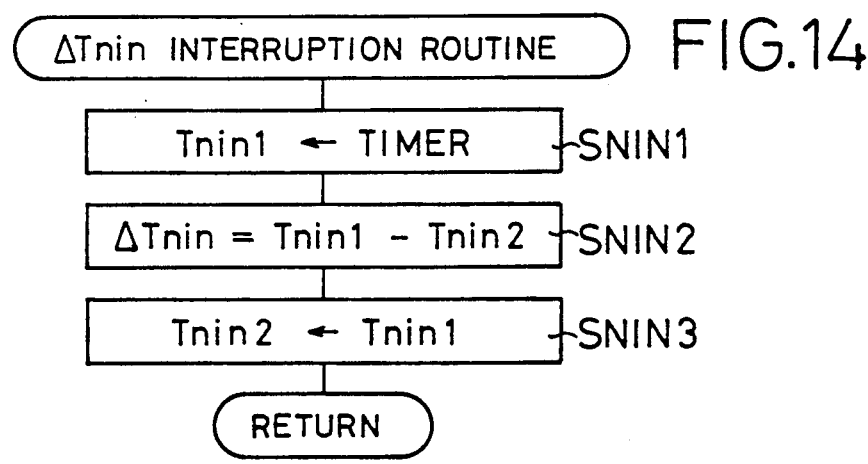

Step SS4 is then implemented to receive through the input interface 34 the signals Ssh and Sidl from the shift knob switch 30 and the idle position switch 32, respectively. The control flow then goes to step SS5 to receive from the input interface 34 a digital signal, which is converted from the analog signal THR from the throttle sensor 24 by an A/D converter provided within the input interface 34. The engine ignition period $\Delta Tne$ and the input shaft rotating period $\Delta Tnin$ are calculated in respective interruption routines of FIGS. 13 and 14, in response to the signals Ne and Nin received from the engine speed sensor 26 and input shaft speed sensor 28, respectively. In the interruption routine of FIG. 13, a current content Tne1 of a timer incorporated in the CPU 42 is read in step SNE1, and the engine ignition period $\Delta Tne$ is obtained in step SNE2 by subtracting a content Tne2 of the timer in the last control cycle from the current content Tne1 (in the present control cycle). Step SNE3 is then executed to store the current content Tne1 as the last content Tne2 of the timer to be used in the next control cycle. Similarly, the interruption routine of FIG. 14 is executed, in which a current content Tnin1 of the timer is read in step SNIN1, and the input shaft rotating period $\Delta Tnin$ is obtained in step SNIN2 by subtracting the last content Tnin2 of the timer from the current content Tnin1. Step SNIN2 is followed by step SNIN3 to store the current content Tnin1 as the last content Tnin2 to be used in the next control cycle.

Figure 3B:
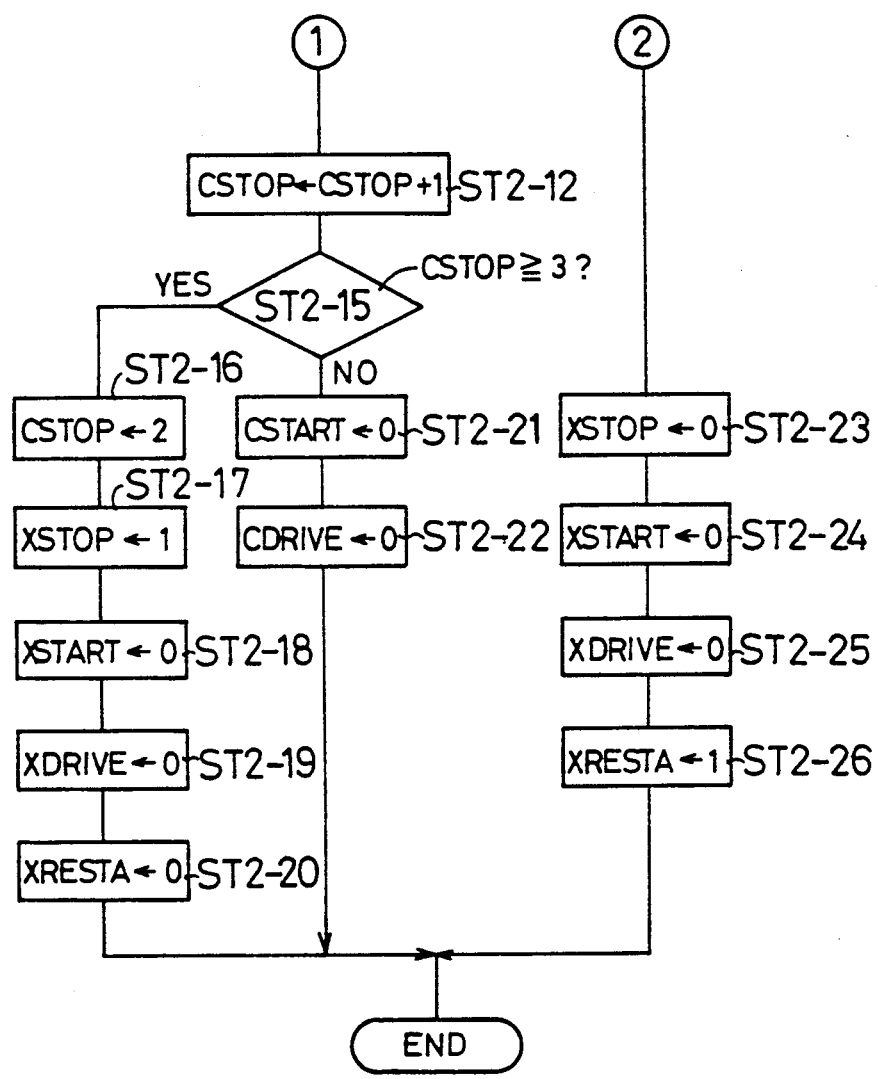

Referring back to the flow chart of FIG. 2, a vehicle condition determining routine as illustrated in the flow charts of FIGS. 3a-3c is implemented in step ST2 to determine the condition of the vehicle, namely, determine which one of the following four different conditions is established: 1. VEHICLE STOP condition in which the vehicle is at a stop with the engine 10 running; 2. CLUTCH RE-ENGAGE condition in which the electromagnetic clutch 12 is being re-engaged after once disengaged; 3. VEHICLE DRIVE condition in which the vehicle is running; and 4. VEHICLE START condition in which the vehicle is being started. When the VEHICLE STOP condition is determined, a flag XSTOP is set to "1". When the CLUTCH RE-ENGAGE condition is determined, a flag XRESTA is set to "1". When the VEHICLE DRIVE condition is determined, a flag XDRIVE is set to "1". When the VEHICLE START condition is determined, a flag XSTART is set to "1".

Described more specifically, step ST2-1 (FIG. 3a) is implemented to determine whether or not the shift knob switch 30 has been turned from the ON state to the OFF state. When an affirmative decision (YES) is obtained in step ST2-1, and when it is determined in step ST2-2 that the input shaft speed Nin is higher than a predetermined reference value Noff (stored in the ROM 38), the CPU 42 determines that the CLUTCH RE-ENGAGE condition is currently established, and the control flow goes to step ST2-23 (FIG. 3b). The CPU 42 determines that the CLUTCH RE-ENGAGE condition is established even when a negative decision (NO) is obtained in step ST2-1, if a negative decision (NO) is obtained in all of steps ST2-3, ST2-5, ST2-6 and ST2-9, that is, if the flags XSTOP, XSTART and XDRIVE are not set at "1" while an absolute difference value |Ne−Nin| between the engine speed Ne and input shaft speed Nin is not lower than a reference value α0 r.p.m. In either of the above two cases, steps ST2-23, steps ST2-24 and ST2-25 are executed to set the flag XSTOP, XSTART and XDRIVE to "0", and then a step ST2-26 is executed to set the flag XRESTA to "1".

The reference value Noff, which is used in step ST2-2 to determine whether the vehicle is at a stop or not, is slightly higher but considerably close to the idling speed of the engine 10. The reference value α is a relatively small value which causes only a small amount of shock when the engine 10 is connected to the input shaft of the speed changing mechanism 14 by engagement of the electromagnetic clutch 12.

In the following four cases, the CPU 42 determines that the VEHICLE STOP condition is currently established: a first case in which a negative decision (N) is obtained in step ST2-2 executed following the affirmative decision (YES) in step ST2-1, that is, if the input shaft speed Nin is not higher than the reference value Noff after the shift lever 22 has been operated; a second case in which an affirmative decision (YES) is obtained in step ST2-3, confirming that the flag XSTOP is set at "1", and a negative decision (NO) is obtained in step ST2-4, confirming that the idle position switch 32 is not OFF (i.e., the accelerator pedal 16 is depressed); a third case in which an affirmative decision (YES) is obtained in step ST2-5, confirming that the flag XSTART is set at "1", and an affirmative decision (YES) is obtained in step ST2-10, confirming that the idle position switch 32 is ON (the accelerator pedal 16 is in the engine idling or non-operated position) while the input shaft speed Nin is lower than the reference value Noff; and a fourth case in which an affirmative decision (YES) is obtained in step ST2-6, confirming that the flag XDRIVE is set at "1", and an affirmative decision (YES) is obtained in step ST2-8, confirming the ON state of the idle position switch 32, after an affirmative decision (YES) is obtained in step ST2-7, confirming that the input shaft speed Nin is lower than the reference value Noff. In the above four cases, the control flow goes to steps ST2-12, ST2-15, ST2-21, ST2-22, and ST2-16 through ST2-20, for eventually set the flag XSTOP to "1". More particularly, a counter CSTOP is incremented in step ST2-12, and step ST2-15 is implemented to determine whether the content of the counter CSTOP is equal to "3" or not. Initially, a negative decision (NO) is obtained in step ST2-15, and the control flow goes to steps ST2-21 and ST2-22, to reset counters CSTART and CDRIVE to "0". With step ST2-12 repeatedly executed in the following control cycles, an affirmative decision (YES) is obtained in step ST2-15, with the content of the counter CSTOP being equal to "3". In this case, step ST2-15 is followed by step ST2-16 in which the counter CSTOP is set to "2" so that the affirmative decision (YES) is obtained in step ST2-15 in the following control cycles. Then, step ST2-17 is executed to set the flag XSTOP to "1", and steps ST2-18 through ST2-20 are executed to reset the flags XSTART, XDRIVE and XRESTA to "0", respectively.

In the following three cases, the CPU 42 determines that the VEHICLE DRIVE condition is currently established: a first case in which an affirmative decision (YES) is obtained in step ST2-9, confirming that the difference |Ne−Nin| is lower than the reference value $\alpha$: a second case in which an affirmative decision (YES) is obtained in step ST2-6, confirming that the flag XDRIVE is set at "1", and a negative decision (NO) is obtained in step ST2-7, confirming that the input shaft speed Nin is not lower than the reference value Noff; and a third case in which an affirmative decision (YES) is obtained in step ST2-5, confirming that the flag XSTART is set at "1", and an affirmative decision (YES) is obtained in step ST2-11, confirming the difference |Ne−Nin| is lower than the reference value $\alpha$, after a negative decision (NO) is obtained in step ST2-10, confirming that the idle position switch 32 is OFF and/or the input shaft speed Nin is not lower than the reference speed Noff. In the above three cases, the control flow goes to execute steps ST2-13, ST2-27, ST2-33, ST2-34, and ST2-28 through ST2-32, which are similar to steps ST2-12, ST2-15, ST2-21, ST2-22, and ST2-17 through ST2-20 which have been described above with respect to the VEHICLE STOP condition. More particularly, the counters CSTOP and CSTART are reset to "0". When the content of the counter CDRIVE is equal to "3", the flags XSTOP, XSTART and XRESTA are reset to "0" and the flag XDRIVE is set to "1".

In the following three cases, the CPU 42 determines that the VEHICLE START condition is currently established: a first case in which an affirmative decision (YES) is obtained in step ST2-3, confirming that the flag XSTOP is set at "1", and an affirmative decision (YES) is obtained in step ST2-4, confirming that the idle position switch 32 is OFF; a second case in which an affirmative decision (YES) is obtained in step ST2-6, confirming that the flag XDRIVE is set at "1", and a negative decision (NO) is obtained in step ST2-8, confirming that the idle position switch 32 is OFF, after an affirmative decision (YES) is obtained in step ST2-7, confirming that the input shaft speed Nin is lower than the reference value Noff; and a third case in which an affirmative decision (YES) is obtained in step ST2-5, confirming that the flag XSTART is set at "1", and a negative decision (NO) is obtained in step ST2-11, confirming the difference |Ne−Nin| is not lower than the reference value $\alpha$, after a negative decision (NO) is obtained in step ST2-10, confirming that the idle position switch 32 is OFF and/or the input shaft speed is not lower than the reference speed Noff. In the above three cases, the control flow goes to execute steps ST2-14, ST2-35, ST2-41, ST2-42, and ST2-36 through ST2-40, which are similar to steps ST2-12, ST2-15, ST2-21, ST2-22, and ST2-17 through ST2-20 which have been described above with respect to the VEHICLE STOP condition. More particularly, the counters CSTOP and CDRIVE are reset to "0". When the content of the counter CSTART is equal to "3", the flags XSTOP, XDRIVE and XRESTA are reset to "0" and the flag XSTART is set to "1".

Referring back to FIG. 2, the vehicle condition determining routine in step ST2 described above is followed by step ST3 to determine whether the shift knob switch 30 is ON or not. If the switch 30 is ON, step ST4 is executed. If the switch 30 is OFF, step ST6 is executed. In step ST4, an engine torque calculating routine is implemented as illustrated in FIG. 4, for calculating an output torque Te of the engine 10. Namely, a portion of the electronic control device 20 assigned to execute step ST4 functions as means for determining the engine output torque Te.

In the engine torque calculating routine in step ST4, step ST4-1 is initially executed to set the content "n" of an engine speed counter to "1". Step ST4-1 is followed by step ST4-2 to determine whether an inequality $Ne_{(n)} < Ne < Ne_{(n+1)}$ is satisfied or not. If a negative decision (NO) is obtained in step ST4-2, step ST4-3 is executed to increment the counter content "n". Steps ST4-2 and ST4-3 are repeatedly executed until an affirmative decision (YES) is obtained in step ST4-2 and the control flow goes to step ST4-4. In step ST4-4, the content "m" of a throttle opening counter is set to "1". Step ST4-4 is followed by step ST4-5 to determine whether an inequality $THR_{(m)} < THR < THR_{(m+1)}$ is satisfied or not. If a negative decision (NO) is obtained in step ST4-5, step ST4-6 is executed to increment the counter content "m". Steps ST4-5 and ST4-6 are repeatedly executed until an affirmative decision (YES) is obtained in step ST4-5 and the control flow goes to step ST4-7 to calculate the output torque of the engine 10.

Figure 5:
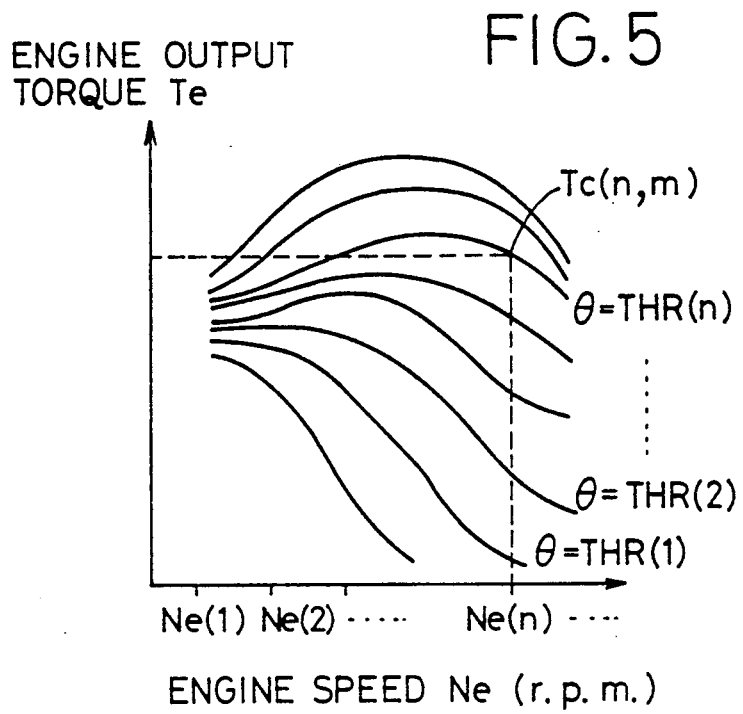
FIG. 5 is a graph indicating an output torque characteristic of an engine of the vehicle of FIG. 1.

Steps ST4-1 through ST4-6 are executed to detect the current engine speed Ne and throttle opening angle THR, by determining Ne and THR ranges in which the currently detected engine speed Ne and throttle angle THR fall. A relatively large number of those Ne and THR ranges are defined by adjacent values $Ne_{(n)}$ and $Ne_{(n+1)}$, and adjacent values $THR_{(m)}$ and $THR_{(m+1)}$, which are stored in the ROM 38 in the form of a data map, as indicated in FIG. 6. In step ST4-7, the actual output torque Te of the engine 10 is calculated or determined according to interpolating equations indicated in the block of ST4-7 in FIG. 4, based on four values $Tc_{(n,m)}$, $Tc_{(n+1,m)}$, $Tc_{(n,m+1)}$ and $Tc_{(n+1,m+1)}$ selected from the data map of FIG. 6 such that these values correspond to upper and lower limits of the Ne and THR ranges in which the currently detected engine speed Ne and throttle opening angle THR fall. The data map of FIG. 6 is prepared based on the output torque characteristic of the engine 10 as shown in FIG. 5, and stored in the ROM 38.

Referring back to the flow chart of FIG. 2, the engine output torque determining routine of FIG. 4 in step ST4 is followed by step ST5 to determine whether the determined engine output torque Te is smaller than a predetermined reference value T1 stored in the ROM 38. This reference value T1 is a value slightly larger than zero, below which a racing of the engine 10 upon sudden disengagement or release of the electromagnetic clutch 12 would not cause considerable degrees of vibrations and noises of the engine 10 which give a driving discomfort or unpleasant driving feel. While the reference value T1 varies with various parameters of the vehicle, it is usually desirable to be slightly larger than zero.

Figure 7:
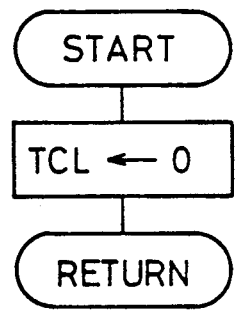
FIG. 7 is a view showing a clutch disengage routine in step ST 9 of the flow chart of FIG. 2.

If the engine output torque Te is smaller than the reference value T1, the electromagnetic clutch 12 is permitted to be disengaged even while the accelerator pedal 16 is operated, and therefore the control flow goes to step ST9 to perform a clutch disengage routine of FIG. 7, in which the content TCL of a clutch torque register is zeroed. The content TCL represents a torque transmitted by the clutch 12. Step ST9 is followed by step ST15 to zero the content TCII of an engine brake torque register, which will be described by reference to FIG. 11. Step ST16 is then implemented to effect a drive current calculating routine of FIG. 15, for determining a drive current PCI to be applied to the electromagnetic clutch 12, depending upon the content TCL of the clutch torque register, and according to a relationship between PCI and TCL stored in the ROM 38. An example of this relationship is illustrated in FIG. 16. In step ST16, the determined drive current PCI is applied to the clutch 12.

Figure 15:
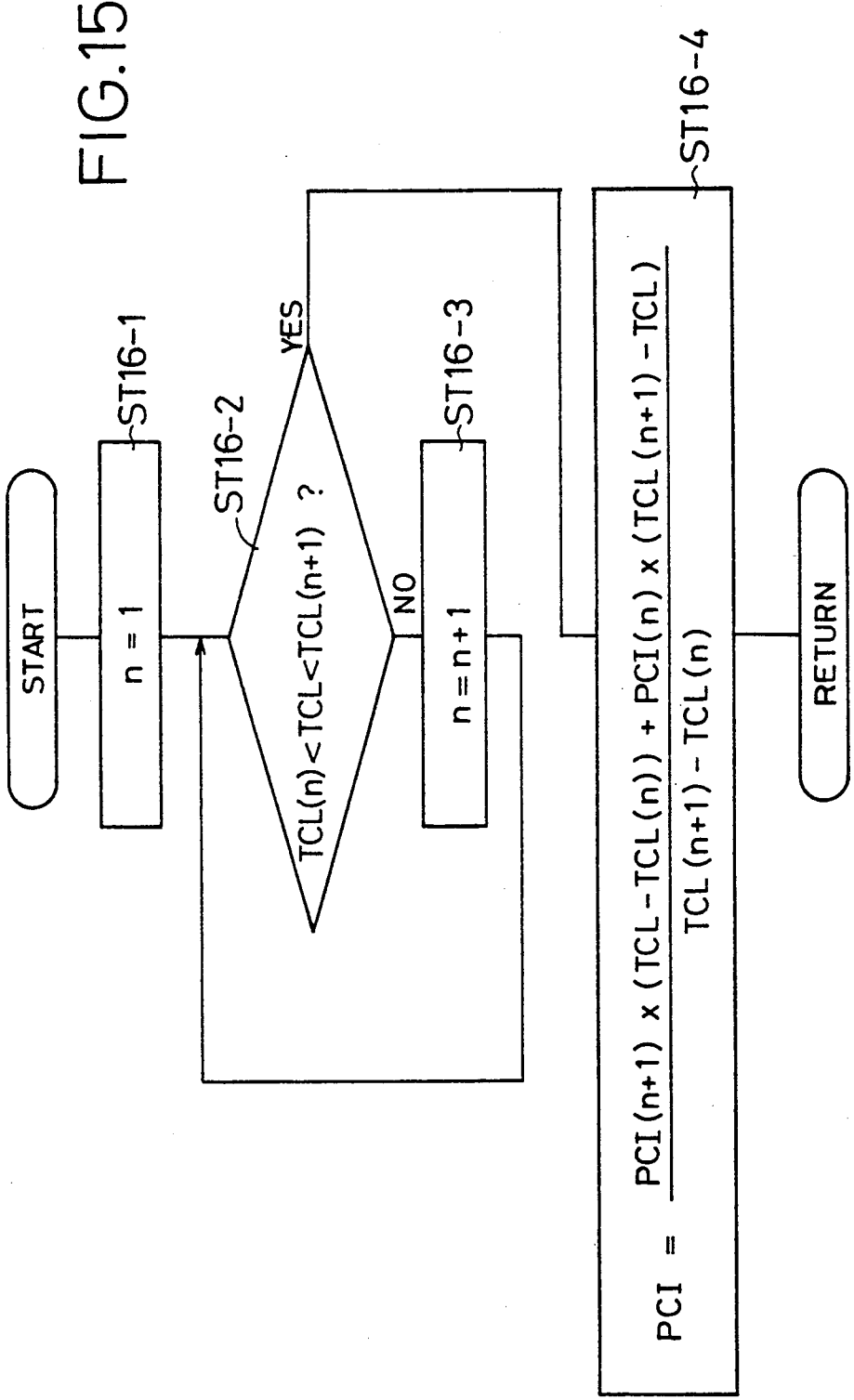
FIG. 15 is a flow chart showing a routine for determining a drive current for the clutch in step ST16 of the flow chart of FIG. 2.
Figure 16:
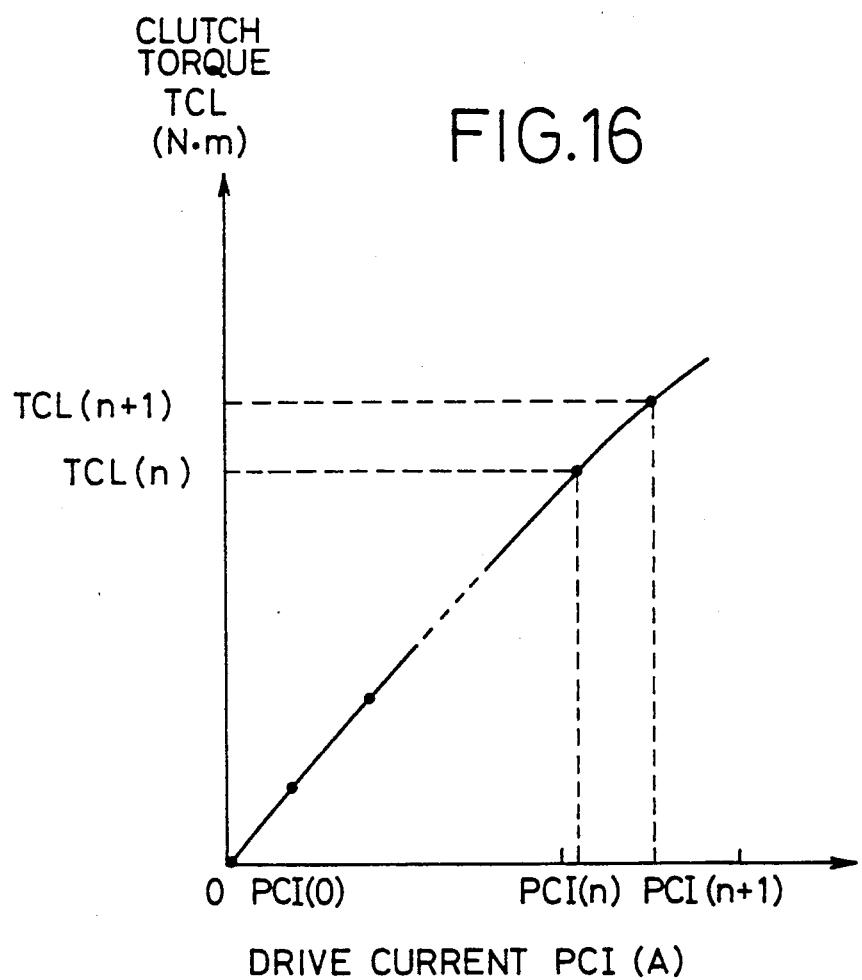
FIG. 16 is a graph indicating a relationship between the clutch drive current and the clutch torque.

In the drive current calculating routine of FIG. 15, step ST16-1 is initially executed to set the content "n" of a clutch torque counter to "1". Step ST16-1 is followed by step ST16-2 to determine whether an inequality $TCL_{(n)} < TCL < TCL_{(n+1)}$ is satisfied or not. If a negative decision (NO) is obtained in step ST16-2, step ST16-3 is executed to increment the counter content "n". Steps ST16-2 and ST16-3 are repeatedly executed until an affirmative decision (YES) is obtained in step ST16-2 and the control flow goes to step ST16-4 to calculate the drive current PCI. Steps ST16-1 through ST16-3 are executed to detect the current clutch torque TCL, by determining a TCL range in which the currently detected clutch torque TCL falls. A relatively large number of the TCL ranges are defined by adjacent values $TCL_{(n)}$ and $TCL_{(n+1)}$, which are stored in the ROM 38 in the form of a data map, as indicated in FIG. 17. In step ST16-4, the actual clutch torque TCL is calculated or determined according to an interpolating equation indicated in the block of ST16-4 in FIG. 4, based on two values $PCI_{(n)}$ and $PCI_{(N+1)}$ selected from the data map of FIG. 6 such that these values correspond to upper and lower limits of the TCL range in which the currently detected clutch torque TCL falls. The data map of FIG. 17 is prepared based on the relationship of FIG. 16 and stored in the ROM 38.

Referring back again to the flow chart of FIG. 2, if a negative decision (NO) is obtained in step ST5, that is, if the determined engine output torque Te is not smaller than the reference value T1, the racing of the engine 10 upon releasing of the electromagnetic clutch 12 causes considerable vibrations and noises of the engine 10 resulting a driving discomfort or unpleasant driving feel. Consequently, step ST5 is followed by step ST6, rather than step ST9 described above. Step ST6 is executed to determine whether the flag XSTOP is set at "1" (indicative of the VEHICLE STOP condition) or not, and is followed by step ST7 to determine whether the flag XSTART is set at "1" (indicative of the VEHICLE START condition) or not. Step ST7 is followed by step ST8 to determine whether the flag XDRIVE is set at "1" (indicative of the VEHICLE DRIVE condition) or not.

Figure 8:
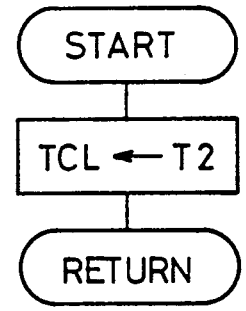
FIG. 8 is a view showing a clutch creep-torque-engage routine in step ST10 of FIG. 2.

If an affirmative decision (YES) is obtained in step ST6, namely, if the flag XSTOP is set at "1", step ST10 is executed to perform a clutch creep-torque-engage routine of FIG. 8. If an affirmative decision (YES) is obtained in step ST7, namely, if the flag XSTART is set at "1", step ST11 is executed to perform a clutch partial-engage routine of FIG. 9. If an affirmative decision (YES) is obtained in step ST8, namely, if the flag XDRIVE is set at "1", step ST12 is executed to perform a clutch lock-up routine of FIG. 10.

In the clutch creep-torque-engage routine of step ST10, the content TCL of the clutch torque register is set to a predetermined value T2, as shown in FIG. 8. This value T2 corresponds to a creep torque transmitted by the clutch 12 while the vehicle is at a stop with a brake applied and the shift lever 22 placed in a forward drive position. When the brake is released, the vehicle can creep with the relatively small creep torque, if the road surface is substantially flat.

Figure 9:
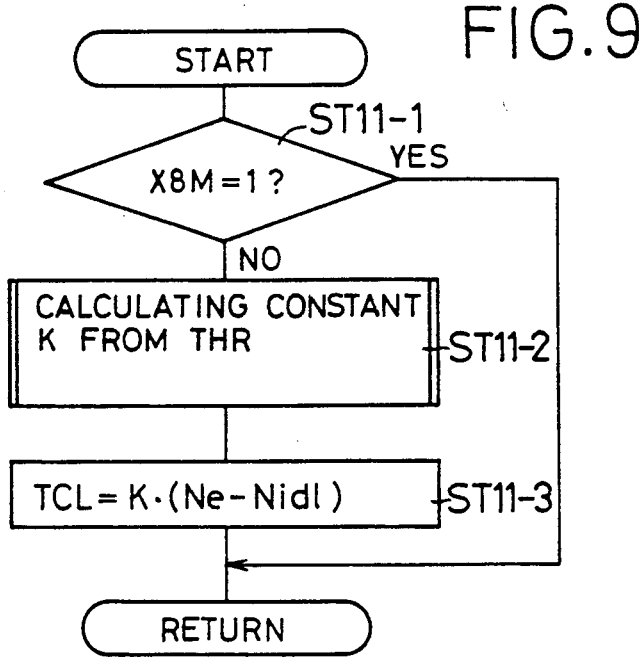
FIG. 9 is a flow chart illustrating a clutch partial-engage routine in step ST11 of FIG. 2.

In the clutch partial-engage routine of FIG. 9, step ST11-1 is initially executed to determine whether the time control flag X8M (referred to above with respect to the initializing routine of FIG. 12) is set at "1" or not. If the flag X8M is currently set at "1", the present routine is terminated. If the flag X8M is not set at "1", steps ST11-2 and ST11-3 are implemented. The time control flag X8M is provided to execute the clutch partial-engage routine at the time interval of 8 msecs, and is reset at the same time interval. In step ST11-2, a constant "K" is calculated in a constant calculating routine of FIG. 21, depending upon the currently detected throttle opening angle THR. In step STK-1 of the routine of FIG. 21, the content "n" of the throttle opening counter is set to "1". Then, step STK-2 is executed to determine whether an inequality $THR_{(n)} < THR < THR_{(n+1)}$ is satisfied or not. If this inequality of step STK-2 is not satisfied, step STK-3 is implemented to increment the content "n". Steps STK-2 and STK-3 are repeatedly executed until an affirmative decision (YES) is obtained in step STK-2 and the control flow goes to step STK-4. In step STK-4, one of the THR ranges each defined by adjacent values $THR_{(n)}$ and THR(n+1) of a data map of FIG. 20 stored in the ROM 38 is selected depending upon the currently detected throttle opening angle THR. The constant "K" is calculated or determined according to an interpolating equation indicated in the block of STK-4 in FIG. 21, based on two values $K_{(n)}$ and $K_{(n+1)}$ selected from the data map of FIG. 20 such that these two values correspond to upper and lower limits of the THR range in which the currently detected throttle opening angle THR falls.

The data map of FIG. 20 is prepared such that the constant "K" satisfies the following equation (3):

$$K_{(n)} = Te_{(n)}/(Ne^m{}_{(n)} - Nidl) \quad (3)$$

Figures 18, 19:
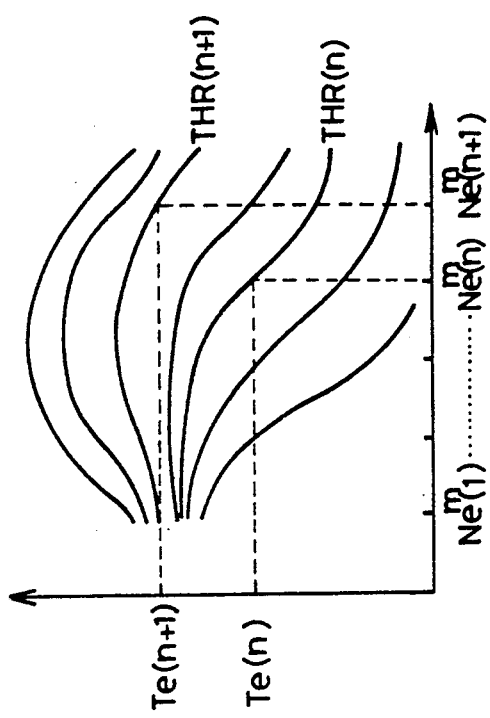
FIG. 18 is a view showing a data map indicative of a relationship between the throttle opening angle and the corresponding target clutch full-engage speed which is used to determine the clutch torque in the clutch partial-engage routine of FIG. 9 upon starting of the vehicle.
FIG. 19 is a graph indicating a relationship among the target full-engage clutch speed, engine output torque, and throttle opening angle.

$Ne^m{}_{(n)}$ is an optimum speed of the engine 10 or clutch 12 corresponding to the throttle opening angle $THR_{(n)}$, at the end of completion of engagement of the clutch 12 upon starting of the vehicle. FIG. 18 shows a data map representative of the relationship between these values $Ne^m{}_{(n)}$ and $THR_{(n)}$. When the optimum engine or clutch speed $Ne^m{}_{(n)}$ corresponding to the currently detected specific throttle opening angle THR is determined, the corresponding optimum output torque $Te_{(n)}$ of the engine 10 is determined according to a relationship of FIG. 20. The constant "K" is determined based on the determined optimum engine output torque $Te_{(n)}$ and a difference $(Ne^m{}_{(n)} - Nidl)$ between the optimum clutch speed $Ne^m{}_{(n)}$ and the engine idling speed Nidl, as indicated by the equation (3).

Referring back to FIG. 9, step ST11-2 for calculating the constant K as described above is followed by step ST11-3 in which the clutch torque TCL upon starting the vehicle by partial engagement of the clutch 12 is determined according to the following equation (4):

$$TCL = K(Ne - Nidl) \quad (4)$$

Figure 10:
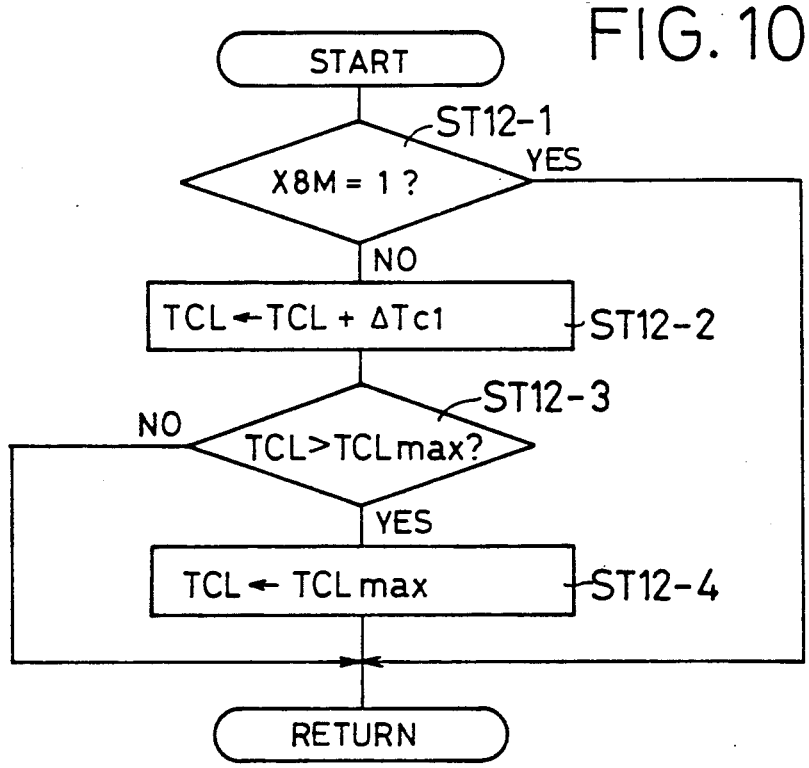
FIG. 10 is a flow chart illustrating a clutch lock-up routine in step S12 of FIG. 2.

The clutch lock-up routine of step ST12 of FIG. 2 is executed as shown in FIG. 10, wherein step ST12-1 similar to step ST11-1 of FIG. 9 is executed, and ST12-2 is executed to increment the content TCL of the clutch torque register by an amount of $\Delta Tc1$. Step ST12-2 is followed by step ST12-3 to determine whether the current content TCL exceeds a predetermined maximum value TCLmax, or not. Steps ST12-1 through ST12-3 are repeatedly executed to increment the content TCL until an affirmative decision (YES) is obtained in step ST12-3. When an affirmative decision is obtained in step ST12-3, the content TCL is set to the maximum value TCLmax. That is, where the VEHICLE DRIVE condition is detected in step ST8, the desired clutch torque TCL is increased to the maximum value TCLmax in step ST12, to increase the drive current PCI corresponding to the maximum value TCLmax in step ST16. It is noted that the increment $\Delta Tc1$ determines the rate at which the drive current PCI is increased.

Figure 11:
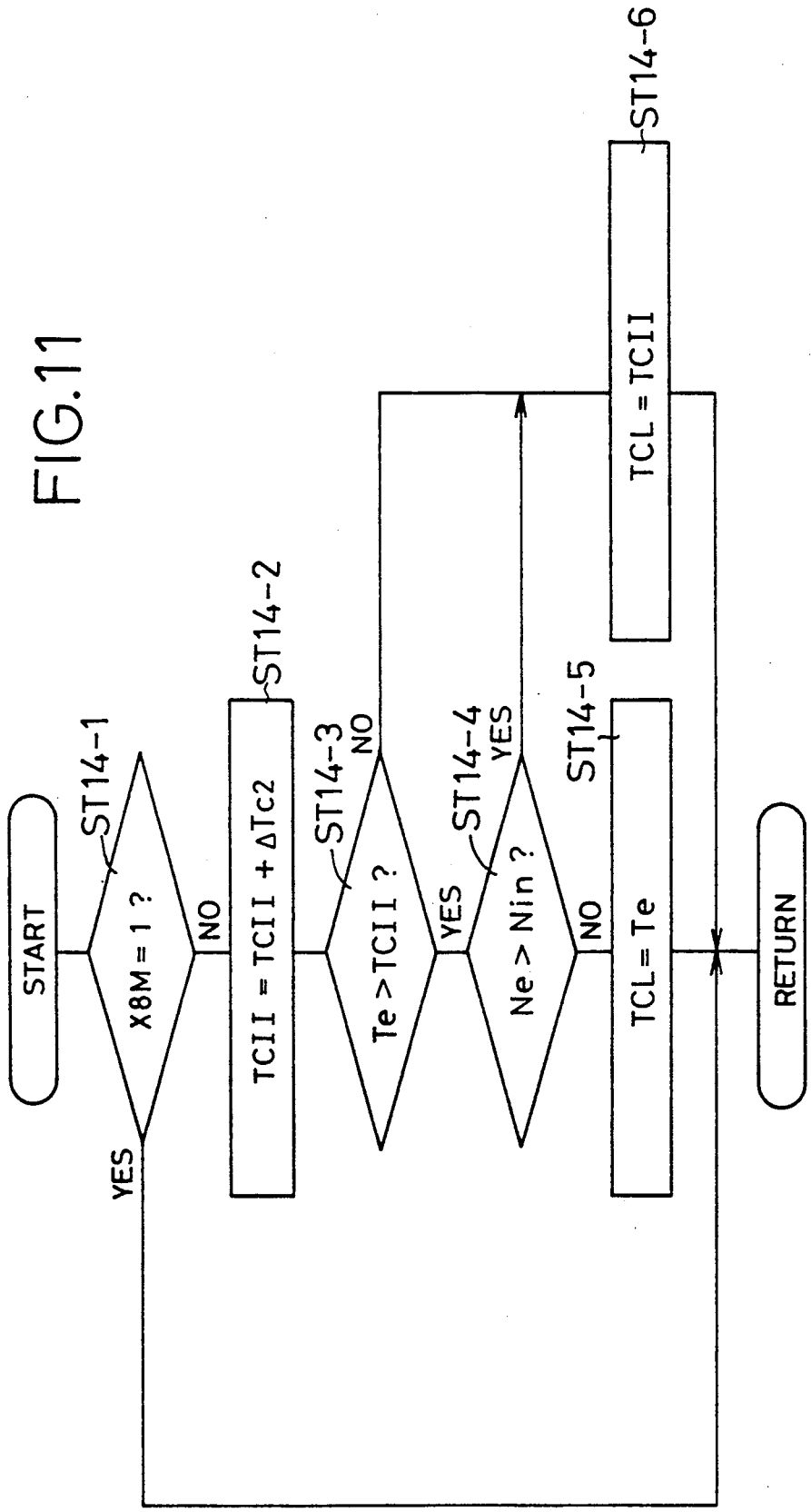
FIG. 11 is a flow chart illustrating a clutch re-engage routine of FIG. 2.

If a negative decision (NO) is obtained in all of the three steps ST6, ST7 and ST8, namely, the flags XSTOP, XSTART and XDRIVE are all "0", the control flow goes to step ST13 in which the same engine torque calculating routine as performed in step ST4 is executed to determine the engine output torque Te, based on the currently detected engine speed Ne and throttle opening angle THR. Then, step ST14 is implemented to perform a clutch re-engage routine as shown in FIG. 11. In this routine, step ST14-1 similar to the step ST11-1 or ST14-1 described above is initially executed, and step ST14-2 is executed to increment the engine brake torque TCII by an amount of $\Delta Tc2$. The engine brake torque TCII is transmitted by the clutch 12 toward the engine 10. Then, step ST14-3 is executed to determine whether the current engine output torque Te exceeds the updated engine brake torque TCII, and step ST14-4 is executed to determine whether the current engine speed Ne exceeds the current input shaft speed Nin. If the engine output torque Te is larger than the engine brake torque TCII and the engine speed Ne is not higher than the input shaft speed Nin, step ST14-5 is executed to set the desired clutch torque TCL to the current engine output torque Te. If the current engine output torque Te is not larger than the engine brake torque TCII, or if the current engine speed Ne is higher than the input shaft speed Nin, step ST14-6 is executed to set the desired clutch torque TCL to the current engine brake torque TCII. In the present clutch re-engage routine, therefore, the desired clutch torque TCL is set as the engine brake torque value TCII which slowly increases to slowly increase the actual clutch torque, until the value TCII increases to the actual output torque value Te. When the engine brake torque value TCII has increased to the actual engine output torque value Te, or when the engine speed Ne has become equal to the input shaft speed Nin, the desired clutch torque TCL is set to the value Te.

In the present control apparatus constructed as described above, a determination is made in step ST5 of FIG. 2 as to whether the actual engine output torque Te is smaller than the predetermined reference value T1 below which the racing of the engine 10 upon sudden releasing or disengagement of the electromagnetic clutch 12 would not cause a driving discomfort or unpleasant driving feel due to vibrations and noises of the racing engine 10. If the engine output torque Te is not smaller than the reference value T1, the clutch 12 is prevented from being fully disengaged or released in step ST9. That is, the control apparatus includes means for inhibiting the clutch 12 from being fully released in response to an operation of the shift lever 22 (detected by the signal Ssh from the switch 30), if the control apparatus determines in step ST5 that the engine output torque Te is equal to or larger than the value T1. Accordingly, a shifting operation of the shift lever 22 to a forward drive position during running of the vehicle will not result in fully releasing or disengaging the electromagnetic clutch 12, if the racing of the engine 10 caused by the full release of the clutch 12 may cause a driving discomfort or deteriorated driving feel.

In the case where the accelerator pedal 16 is released after the operation of the shift lever 22, the electromagnetic clutch 12 is fully released and the speed changing mechanism 14 is shifted to the appropriate position without a racing of the engine 10, since the engine output torque Te is lowered below the reference value T1 due to the releasing of the accelerator pedal 16.

While the present invention has been described in detail in its presently preferred embodiment by reference to the accompanying drawings, it is to be understood that the invention may be embodied otherwise.

In the illustrated embodiment, the output torque Te of the engine 10 is calculated in the calculating routine in step ST4 of FIG. 2 as illustrated in FIG. 4. However, the actual engine output torque Te may be detected by a suitable torque sensor.

While the illustrated control apparatus is adapted to control the semi-automatic transmission system using the electromagnetic clutch 12 of magnetic powder type, the principle of the present invention is equally applicable to a semi-automatic transmission system which uses an automatically controlled clutch such as a hydraulically powered and electrically controlled friction clutch.

Although the illustrated embodiment uses the shift knob switch 30 which senses an operation of the shift lever 22, upon application of an operating force to the lever 22, the switch 30 may be replaced by other switches such as a touch switch which is provided on the shift lever 22 and which generates a signal when it is touched upon operation of the lever 22.

It is to be understood that the invention is not limited to the details of the illustrated embodiment and the modifications indicated above, but may be embodied with various other changes, modifications and improvements, which may occur to those skilled in the art, without departing from the spirit and scope of the invention defined in the following claims.

What is claimed is:

1. A control apparatus for controlling a semi-automatic transmission system for a motor vehicle including a speed changing mechanism connected to an engine through an automatically controlled clutch to transmit power from the engine to a drive wheel of the vehicle, said clutch being disengaged in response to a signal received from shift operation detecting means for detecting an operation of an operator-controlled operating member for shifting said speed changing mechanism, said control apparatus comprising:

torque determining means for determining an output torque of said engine;

comparing means for determining whether the output torque of the engine determined by said torque determining means is smaller than a predetermined reference value below which an increase in a speed of said engine upon full disengagement of said automatically controlled clutch will not significantly deteriorate a driving comfort of the vehicle due to racing of the engine; and clutch control means for inhibiting said automatically controlled clutch from being fully disengaged despite the presence of said signal from said shift operation detecting means indicative of an operation of said operator-controlled operating member, if said comparing means determines that said output torque of the engine is not smaller than said reference value.

2. A control apparatus according to claim 1, wherein said torque determining means comprises means for detecting an opening angle of a throttle valve of said engine, means for detecting a speed of said engine, and means for calculating said output torque of said engine, based on the detected opening angle of said throttle valve and the detected speed of said engine, and according to a predetermined relationship among said opening angle, and speed and output torque of said engine.

3. A control apparatus according to claim 1, wherein said comparing means determines said predetermined reference value such that said reference value is slightly larger than zero.

4. A control apparatus for controlling a semi-automatic transmission system for a motor vehicle including a speed changing mechanism connected to an engine through an automatically controlled clutch to transmit power from the engine to a drive wheel of the vehicle, said clutch being disengaged in response to a signal received from shift operation detecting means for detecting an operator of an operator-controlled operating member for shifting said speed changing mechanism, said control apparatus comprising:

torque determining means for determining an output torque of said engine;

comparing means for determining whether the output torque of the engine determined by said torque determining means is smaller than a predetermined reference value below which an increase in a speed of said engine upon full disengagement of said automatically controlled clutch will not significantly deteriorate a driving comfort of the vehicle; and clutch control means for inhibiting said automatically controlled clutch from being fully disengaged despite the presence of said signal from said shift operation detecting means indicative of an operation of said operator-controlled operating member, if said comparing means determines that said output torque of the engine is not smaller than said reference value, said clutch control means comprising means which is operable while said vehicle is at a stop with a brake applied and with said operator-controlled operating member being placed in a drive position, for controlling said automatically controlled clutch for slight engagement thereof so as to transmit a torque which permits said vehicle to creep when said brake is removed.

5. A control apparatus for controlling a semi-automatic transmission system for a motor vehicle including a speed changing mechanism connected to an engine through an automatically controlled clutch to transmit power from the engine to a drive wheel of the vehicle, said clutch being disengaged in response to a signal received from shift operation detecting means for detecting an operation of an operator-controlled operating member for shifting said speed changing mechanism, said control apparatus comprising:

torque determining means for determining an output torque of said engine;

comparing means for determining whether the output torque of the engine determined by said torque determining means is smaller than a predetermined reference value below which an increase in a speed of said engine upon full disengagement of said automatically controlled clutch will not significantly deteriorate a driving comfort of the vehicle; and clutch control means for inhibiting said automatically controlled clutch from being fully disengaged despite the presence of said signal from said shift operation detecting means indicative of an operation of said operator-controller operating member, if said comparing means determines that said output torque of the engine is not smaller than said reference value, said clutch control means comprising means which is operable while said vehicle is being started, for controlling said automatically controlled clutch for partial engagement thereof so as to transmit a torque which corresponds to a product of a difference between a currently detected speed and an idling speed of said engine, and a constant corresponding to a currently detected opening angle of a throttle valve of the engine.

6. A control apparatus according to claim 5, wherein said means for controlling said automatically controlled clutch for partial engagement thereof determines said constant based on a difference between said idling speed of said engine and an optimum speed of said engine upon complete engagement of said clutch with said currently detected opening angle of said throttle valve, and an output torque of said engine which is produced at said optimum speed of said engine.

7. A control apparatus for controlling a semi-automatic transmission system for a motor vehicle including a speed changing mechanism connected to an engine through an automatically controlled clutch to transmit power from the engine to a drive wheel of the vehicle, said clutch being disengaged in response to a signal received from shift operation detecting means for detecting an operation of an operator-controlled operating member for shifting said speed changing mechanism, said control apparatus comprising:

torque determining means for determining an output torque of said engine;

comparing means for determining whether the output torque of the engine determined by said torque determining means is smaller than a predetermined reference value below which an increase in a speed of said engine upon full disengagement of said automatically controlled clutch will not significantly deteriorate a driving comfort of the vehicle; and clutch control means for inhibiting said automatically controlled clutch from being fully disengaged despite the presence of said signal from said shift operation detecting means indicative of an operation of said operator-controlled operating member, if said comparing means determines that said output torque of the engine is not smaller than said reference value, said clutch control means comprising means operable during engagement of said automatically controlled clutch following full disengagement thereof, for initially controlling said clutch so as to increase an engine brake torque transmitted thereby to said engine, at a relatively low rate, and then controlling said clutch so as to eventually transmit a torque equal to a currently determined torque of said engine after said currently determined torque has become equal to the engine brake torque.

8. A method of controlling a semi-automatic transmission system for a motor vehicle including a speed changing mechanism connected to an engine through an automatically controlled clutch to transmit power from the engine to a drive wheel of the vehicle, said clutch being disengaged in response to a signal received from shift operation detecting means for detecting an operation of an operator-controlled operating member for shifting said speed changing mechanism, said method comprising the steps of:

determining an output torque of said engine by torque determining means;

determining whether the output torque of the engine determined by said torque determining means is smaller than a predetermined reference value below which an increase in a speed of said engine upon full disengagement of said automatically controlled clutch will not significantly deteriorate a driving comfort of the vehicle due to racing of the engine; and inhibiting said automatically controlled clutch from being fully disengaged despite the presence of said signal from said shift operation detecting means indicative of an operation of said operator-controlled operating member, if said output torque of the engine is not smaller than said reference value.

\* \* \* \* \*